US006963446B2

(12) United States Patent
Nihoshi

(10) Patent No.: US 6,963,446 B2
(45) Date of Patent: Nov. 8, 2005

(54) EPI-ILLUMINATION APPARATUS

(75) Inventor: Toshiaki Nihoshi, Yokohama (JP)

(73) Assignee: Nikon Corporation, Tokyo (JP)

( * ) Notice: Subject to any disclaimer, the term of this patent is extended or adjusted under 35 U.S.C. 154(b) by 37 days.

(21) Appl. No.: 10/315,162

(22) Filed: Dec. 10, 2002

(65) Prior Publication Data

US 2003/0112505 A1    Jun. 19, 2003

(30) Foreign Application Priority Data

Dec. 14, 2001  (JP)  .............................. 2001-380804
Aug. 29, 2002  (JP)  .............................. 2002-251344

(51) Int. Cl.$^7$ .......................................... G02B 21/06
(52) U.S. Cl. ..................................... 359/388; 359/389
(58) Field of Search ........................... 359/368, 385, 359/388, 389, 819, 821, 827

(56) References Cited

U.S. PATENT DOCUMENTS

| 3,137,761 | A | * | 6/1964 | Rudolf .......................... 359/388 |
| 3,679,287 | A | * | 7/1972 | Takahashi et al. ........... 359/388 |
| 4,253,726 | A | * | 3/1981 | Taira ............................ 359/388 |
| 4,397,529 | A | * | 8/1983 | Taira ............................ 359/381 |
| 4,521,076 | A | * | 6/1985 | Weber et al. ................. 359/739 |
| 5,128,808 | A | * | 7/1992 | Dosaka ......................... 359/821 |
| 5,684,625 | A | * | 11/1997 | Stankewitz et al. .......... 359/385 |
| 5,777,784 | A | | 7/1998 | Tanaka ......................... 359/388 |
| 2002/0159143 | A1 | | 10/2002 | Yonezawa .................... 359/385 |

FOREIGN PATENT DOCUMENTS

JP          6-289301        10/1994

* cited by examiner

*Primary Examiner*—Mark A. Robinson
(74) *Attorney, Agent, or Firm*—Miles & Stockbridge P.C.

(57) ABSTRACT

An epi-illumination apparatus has, in the following order from an light source device side, a first imaging lens which forms an image of the light source and a field lens which projects the image of the light source to an object to be illuminated. Either one of a first magnification varying unit or a second magnification varying unit is selectively disposed between the first imaging lens and the field lens in order to vary a magnification of the image of the light source. The first magnification varying unit has a first aperture stop and a second imaging lens that is disposed in the field lens side of the first aperture stop, while the second magnification varying unit has a second aperture stop and a third imaging lens that is disposed in the first imaging lens side of the second aperture stop.

7 Claims, 4 Drawing Sheets

EPI-ILLUMINATION APPARATUS

This application claims the benefit of Japanese Patent applications No. 2001-380804 and No. 2002-251344 which are hereby incorporated by reference.

BACKGROUND OF THE INVENTION

1. Field of the Invention

The present invention relates to an epi-illumination apparatus used in a fluorescence microscope or a microscope for industrial use etc.

2. Related Background Art

Generally, the epi-illumination apparatus of a microscope is provided with a halogen lamp or a discharge tube, such as an Hg discharge tube or an Xe discharge tube, etc as a light source. The halogen lamp has a light emitting surface of the size of about 3 mm to 5 mm, while the discharge tube such as an Hg or Xe discharge tube has a light emitting area of the size of about 0.3 mm to 0.5 mm. On the other hand, the size of the pupil of an objective lens to be illuminated is about 16 mm at largest. Therefore, in the epi-illumination apparatus using the halogen lamp, the magnification of the light source (i.e. the magnification at which the light source is magnified) is set to about 4× so that substantially whole of the pupil of the objective lens would be illuminated with the illumination light. On the other hand, in the apparatus using the Hg or Xe lamp, the magnification of the light source in the illumination apparatus must be set to a higher magnification, and in general the magnification is set to about 10×.

Recently, demand for an epi-illumination apparatus in which both the Hg lamp and Xe lamp can be used has been raised in order to allow inspection of a specimen in various observation methods. In order to meet this demand, Japanese Patent Application Laid-Open No. 6-289301 proposes a structure that enables use of both a halogen lamp and an Hg lamp in one single epi-illumination apparatus by inserting/withdrawing a variable magnification optical system in the form of a substantially a focal system into/from a space between a lamp house and an epi-illumination light projecting tube to thereby vary the magnification of the light source.

However, the size of the above-mentioned epi-illumination apparatus disclosed in Japanese Patent Application Laid-open No. 6-289301 is large, since the optical path length of its entire illumination optical system is extended in order to allow the insertion and withdrawal of the substantially a focal optical system between the lamp house and the epi-illumination light projecting tube for varying the magnification of the light source.

SUMMARY OF THE INVENTION

In view of the above situations, an object of the present invention is to provide an epi-illumination apparatus in which the magnification of the light source can be easily varied while maintaining compactness of its optical system.

In order to attain the above object, according to the present invention, there is provided an epi-illumination apparatus comprising, in the following order from a light source device side:

a first imaging lens which forms an image of the light source; and a field lens which projects said image of the light source toward an object to be illuminated;

wherein either one of a first magnification varying unit or a second magnification varying unit is selectively disposed between the first imaging lens and the field lens in order to vary a magnification of the image of the light source, the first magnification varying unit including a first aperture stop and a second imaging lens that is disposed in the field lens side of the first aperture stop, and the second magnification varying unit including a second aperture stop and a third imaging lens that is disposed in the first imaging lens side of the second aperture stop.

In the above-mentioned epi-illumination apparatus, the first aperture stop in the first magnification varying unit may be disposed at a focal point position of the first imaging lens, and the second aperture stop in the second magnification varying unit may be disposed at a combined focal point position of the first and third imaging lenses.

The above-mentioned epi-illumination apparatus may be arranged in such a way that:

the object to be illuminated is an objective lens of a microscope;

the field lens projects the image of the light source at the position of a pupil of the objective lens;

the first aperture stop in said first magnification varying unit is optically conjugate to a pupil position of the objective lens with respect to the second imaging lens and said field lens; and the second aperture stop in the second magnification varying unit is optically conjugate to the pupil position of the objective lens with respect to the field lens.

The above-mentioned epi-illumination apparatus may be arranged in such a way that a field stop is disposed between the field lens and the first or second magnification varying unit, and a position that is optically conjugate to the field stop with respect to the first imaging lens and the second or third imaging lens coincides with a rear focal point position of a collector lens that is included in the light source device.

According to the present invention, there is also provided an epi-illumination apparatus comprising:

a light source;

a collector lens that condenses a light flux emitted from the light source so as to change it into a parallel ray;

an imaging lens that condenses the parallel ray so as to form an image of the light source;

a field lens that projects the image of the light source toward an object to be illuminated; and an aperture stop disposed between the imaging lens and the field lens and at a position optically conjugate to a pupil position of an objective lens of a microscope;

wherein a magnification of the light source is varied by inserting/withdrawing a magnification varying optical system in/from a front or back side of the aperture stop.

In this epi-illumination apparatus, the aperture stop and the magnification varying optical system may be formed as a unit, which is to be inserted/withdrawn into/from an optical path of the epi-illumination apparatus.

BRIEF DESCRIPTION OF THE DRAWINGS

FIGS. 1A and 1B are diagrams of an epi-illumination apparatus according to an embodiment of the present invention, wherein FIG. 1A shows a state in which a magnification varying unit 7 is mounted on the apparatus, and FIG. 1B shows a state in which another magnification varying unit 17 is mounted on the apparatus.

DETAILED DESCRIPTION OF THE PREFERRED EMBODIMENTS

In the following an embodiment of the present invention will be described with reference to the drawings.

Figures 1A, 1B:
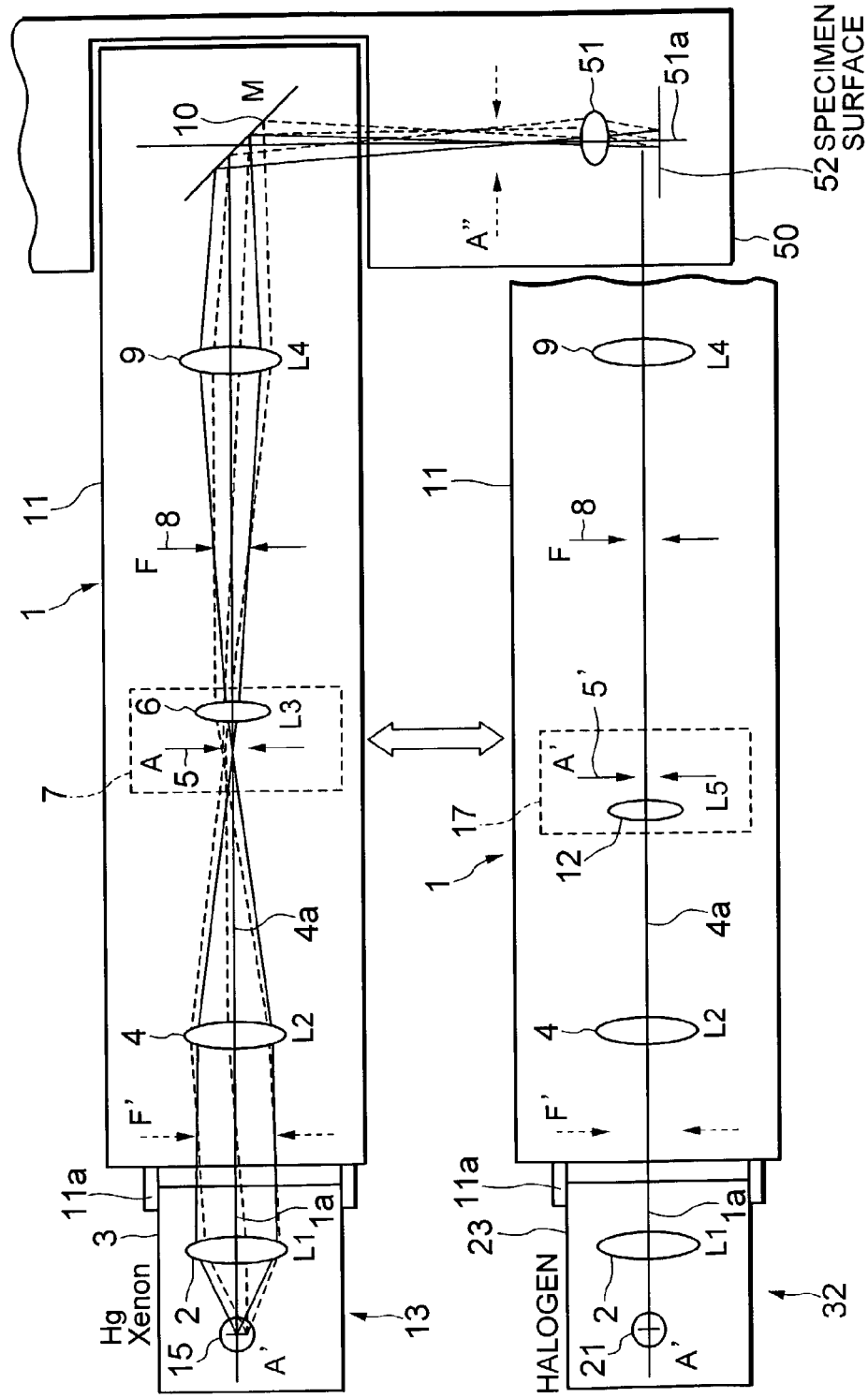

As shown in FIG. 1A, an epi-illumination apparatus 1 according to the present embodiment has a lens barrel 11 in which an imaging lens (L2) 4 and a series of elements including an aperture stop (A) 5, an imaging lens (L3) 6, a field stop (F) 8, a field lens (L4) 9 and a half mirror or dichroic mirror (M) 10 which are disposed on an optical axis 4a of the imaging lens (L2) 4 in the mentioned order. The aperture stop (A) 5 and the imaging lens (L3) 6 are mounted on a lens frame (not shown) that is adapted to be detachably attached to the lens barrel 11, to constitute a magnification varying unit 7. Alternatively, another magnification varying unit 17 shown in FIG. 1B may be inserted or attached to the lens barrel 11 instead of the magnification varying unit 7. The magnification varying unit 17 is composed of an imaging lens (L5) 12 and an aperture stop (A') 5' mounted on a lens frame that is adapted to be detachably attached to the lens barrel 11. The magnification varying unit 7 and the magnification varying unit 17 have similar aperture stops respectively, but their arrangements are different from each other. That is, in the magnification varying unit 7, the imaging lens (L3) 6 is disposed in the field stop (F) 8 side of the aperture stop (A) 5, while in the magnification varying unit 17, the imaging lens (L5) 12 is disposed in the imaging lens (L2) 4 side of the aperture stop (A') 5'. Due to this difference, the magnification of the light source can be varied by interchanging these magnification varying units 7 and 17. Specifically, in the magnification varying unit 7, the aperture stop (A) 5 is disposed at the focus position (i.e focal point position) of the imaging lens (L2) 4, while in the magnification varying unit 17, the aperture stop (A') 5' is disposed at the combined focus position of the imaging lens (L2) 4 and the imaging lens (L5) 12.

The lens barrel 11 is provided, at its end near the imaging lens (L2) 4, with a mounting portion 11a to which a lamp house 12 or 32 is to be mounted. The lamp house 12 is provided with a barrel 3, a light source (A') 1 in the form of an Hg or Xe discharge tube, and a collector lens (L1) 2. On the other hand, the lamp house 32 is provided with a barrel 23, a light source (A') 21 in the form of a halogen lamp, and a collector lens ((L1') 2'. The light sources 15 and 21 are disposed on the optical axes 1a and 1a' of the collector lenses 2 and 2' respectively. The lamp houses 13 and 32 are adapted in such a way that when they are mounted on the mounting portion 11a of the epi-illumination apparatus 1, their optical axes 1a and 1a' coincide with the optical axis 4a.

The other end portion of the lens barrel 11 near the half mirror or dichroic mirror (M) 10 is inserted into a space between an objective lens 51 and an imaging lens (not shown) in the barrel 50 of a microscope. This end portion of the lens barrel 11 is disposed in such a way that the optical axis of a light flux having been deflected by the half mirror or dichroic mirror (M) 10 coincides with the optical axis 51a of the objective lens 51. Incidentally, the diameter of the pupil A'' of the objective lens is about 16 mm.

In the case in which the lamp house 13 that has the light source (A') 15 in the form of an Hg or Xe discharge tube is mounted on the epi-illumination apparatus, since the light emitting area of the Hg or Xe discharge tube as the light source (A') 15 is as small as about 0.3 mm to 0.5 mm, it is magnified by the epi-illumination apparatus 1 about 8× (eight times) so as to illuminate the pupil A'' of the objective lens 51. On the other hand in the case in which the lamp house 32 that has the light source (A') 21 in the form of a halogen lamp is mounted on the epi-illumination apparatus, since the light emitting surface of the halogen lamp is as large as about 3 mm to 5 mm, it is magnified by the epi-illumination apparatus 1 about 4× (four times) so as to illuminate the pupil A'' of the objective lens 51. For these purposes, when the lamp house having the Hg or Xe discharge tube is mounted, the magnification varying unit 7 is inserted, as shown in FIG. 1A, while when the lamp house 32 having the halogen lamp is mounted, the magnification varying unit 17 is inserted, as shown in FIG. 1B. Thus, the magnification of the light source is varied.

In the following, a description will be made of a light flux in the apparatus in the state in which the magnification varying unit 7 is mounted. A light flux emitted form the light source (A') 1 passes through the collector lens (L1) 2 to become a substantially parallel light flux, which, in turn, is incident on the imaging lens (L2) 4 so as to be imaged at the position of the aperture stop (A) 5, and further imaged by the imaging lens (L3) 6 and the field lens (or projecting lens) (L4) 9, so that an image of the light source is formed at the position of the pupil A'' of the objective lens 51. The field stop (F) 8 is optically conjugate to a specimen surface 52. The half mirror or dichroic mirror 10 deflects a light flux having passed through the field lens (L4) 9 so as to direct it along the optical axis 51a of the barrel 50 of the microscope. In FIG. 1A, reference sign F' appearing between the collector lens (L1) 2 and the imaging lens (L2) 4 designates a plane that is optically conjugate to the field stop (F) 8 with respect to the imaging lens (L3) 6 and the imaging lens (L2) 4.

On the other hand, in the apparatus in which the magnification varying unit 17 is mounted as shown in FIG. 1B, a substantially parallel light flux emergent from the collector lens 4 is imaged at the position of the aperture stop (A') 5' by the imaging lens (L2) 4 and the imaging lens (L5) 12. Therefore, the position of the aperture stop (A') 5' of the magnification varying unit 17 is shifted toward the objective lens (L2) 4 as compared to the aperture stop (A) 5 of the magnification varying unit 7. The light flux imaged at the position of the aperture stop (A') 5' is re-imaged by the imaging lens (L4) 9 to form an image of the light source at the position of the pupil A'' of the objective lens 51.

In the apparatus in which the magnification varying unit 17 is mounted the field stop (F) 8 is optically conjugate to the specimen surface 52 in the same manner as the magnification varying unit 7 is mounted.

In the following, how the required magnification of the light source can be varied by replacing the magnification varying unit 7 with the magnification varying unit 17 will be described with reference to FIGS. 2A, 2B, 3A and 3B.

The combined focal length f1 of the imaging lens (L2) 4 and the imaging lens (L3) 6 (in the case shown in FIG. 1A), is represented as follows:

$$1/f1 = 1/|L2| + 1/|L3| - d1/(|L2| \cdot |L3|).$$

On the other hand, the combined focal length f2 of the imaging lens (L2) 4 and the imaging lens (L5) 12 (in the case shown in FIG. 1B) is represented as follows:

$$1/f2=1/|L2|+1/|L5|-d2/(|L2|\cdot|L5|).$$

In the above equations, |L2|, |L3| and |L4| represent focal lengths of the imaging lens (L2) 4, the imaging lens (L3) 6 and the imaging lens (L5) 12 respectively, d1 represents the distance between the imaging lens (L2) 4 and the imaging lens (L3) 6, and d2 represents the distance between the imaging lens (L2) 4 and the imaging lens (L5) 12.

The position x1 at which an image of the aperture stop (A) 5 is formed by the imaging lens (L3) 6 and its magnification β1 satisfy the following equations (see FIG. 3A):

$$1/a+1/x1=1/|L3|, \text{ and}$$

$$β1=x1/a.$$

On the other hand, the position x2 at which an image of the aperture stop (A') 5' is formed by the imaging lens (L5) 12 and its magnification β2 satisfy the following equations (see FIG. 3B):

$$1/b+1/x2=1/|L5|, \text{ and}$$

$$β2=b/x2.$$

In the above equations, a represents the distance between the imaging lens (L3) 6 and the aperture stop (A) 5, b represents the distance between the imaging lens (L5) 12 and the aperture stop (A') 5=, x1 represents the distance from the imaging lens (L3) 6 to the aperture stop (A) 5, and x2 represents the distance from the imaging lens (L5) 12 to the imaging lens (L2) 4.

Figures 2A, 2B:
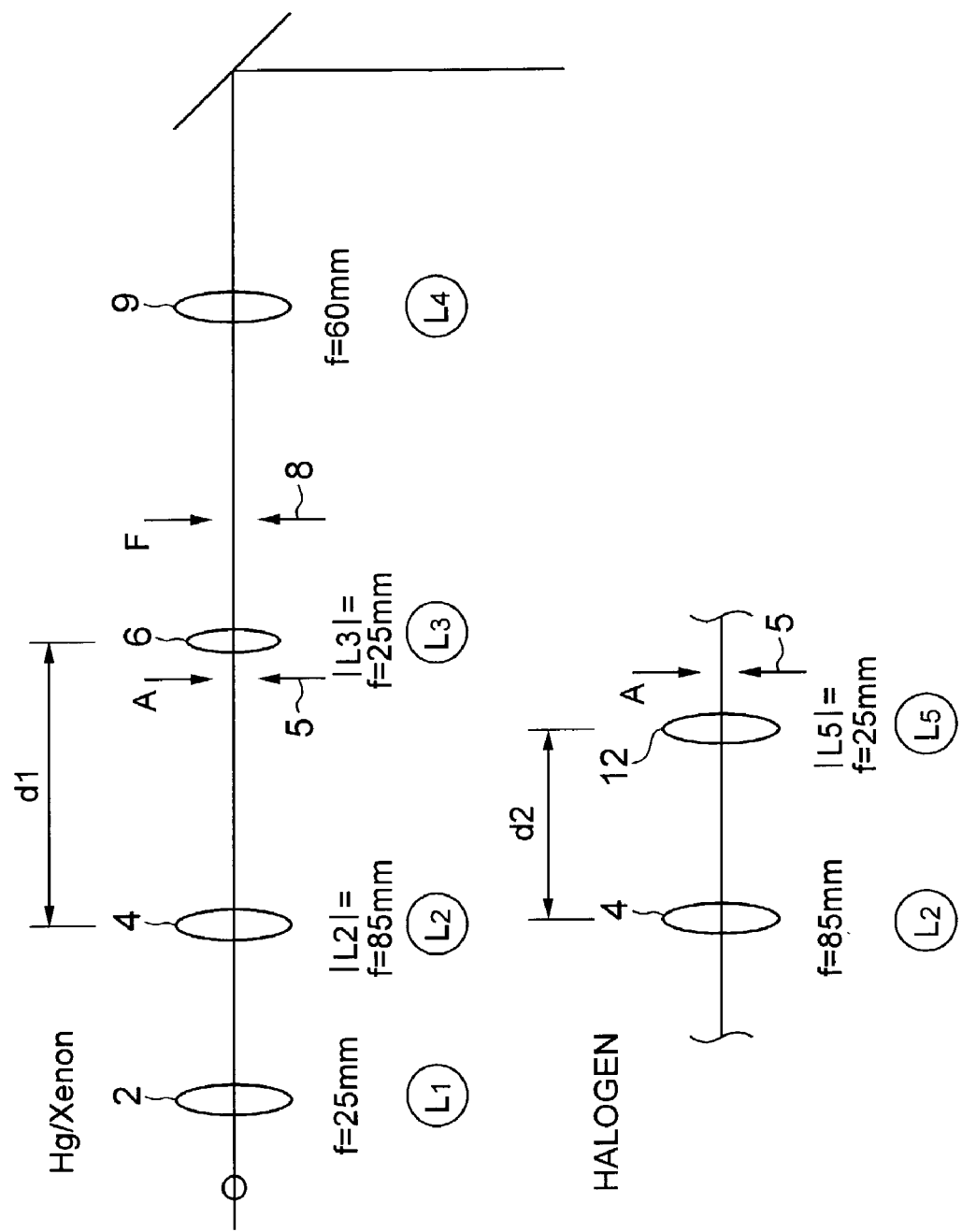
FIGS. 2A and 2B are diagrams showing examples of the focal lengths of imaging lenses in the epi-illumination apparatus according to the embodiment of the present invention.
Figure 3A:
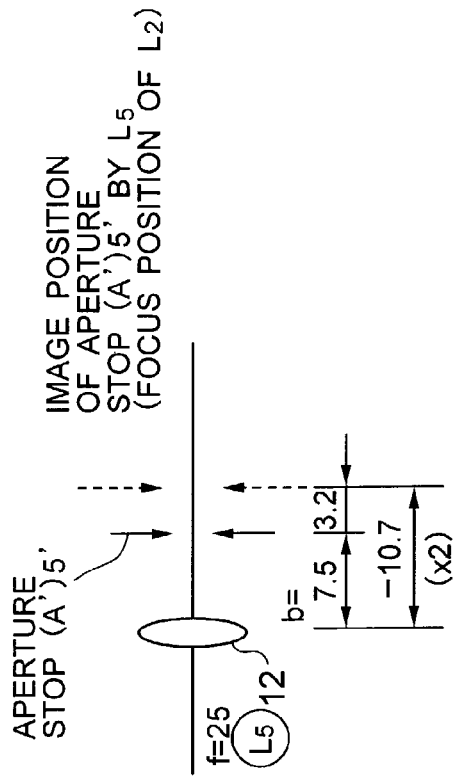
FIGS. 3A and 3B are diagrams and equations for illustrating combined focal lengths and the magnifications of aperture stop images in the magnification varying units 7 and 17.
Figure 3B:
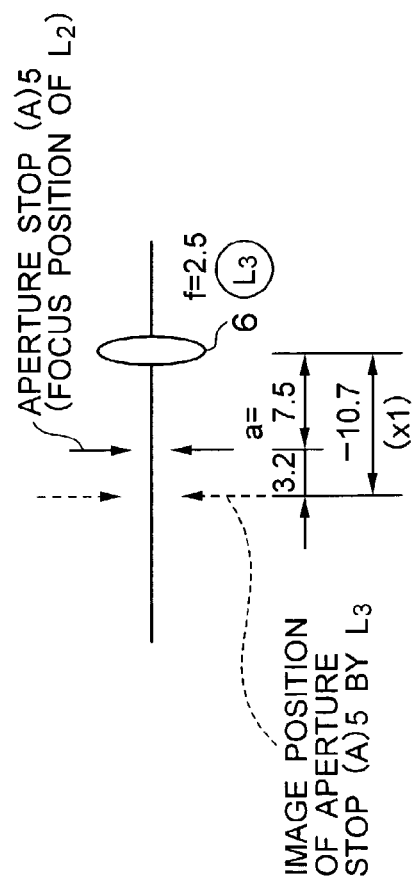

For the sake of explanation, it is assumed that the imaging lens (L3) 6 and the imaging lens (L5) 12 have the same focal length (i.e. |L3|=|L5|), the focal lengths f4, f6 and f12 of the lenses 4, 6 and 12 are 85 mm, 25 mm and 25 mm respectively (i.e. f4=85 mm, f6=25 mm and f12=25 mm) as shown in FIGS. 2A and 2B, and the distance a between the aperture stop (A) 5 and the imaging lens (L3) 6 is 7.5 mm as shown in FIG. 3A (i.e. a=7.5 mm), and the distance b between the imaging lens (L5) 12 and the aperture stop (A') 5' is 7.5 mm as shown in FIG. 3B (i.e. b=7.5 mm).

Under the above assumptions, since d1=|L2|+7.5 mm, the above mentioned combined focal length f1 is calculated as per equation (1) shown in FIG. 3A. Thus the combined focal length f1 is determined as f1=121.4 mm. Similarly, since d2=|L2|-x2, the above-mentioned combined focal length f2 is calculated as per equation (3) in FIG. 3B. Thus the combined focal length f2 is determined as f2=59.9 mm.

An image of the light source at the position of the aperture stop (A) 5 is formed by the imaging lens (L3) 6 at the position x1=−10.7 mm with the magnification β1=1.43 approximately (see equation (2) in FIG. 3A). An image of the light source at the position of the aperture stop (A') 5' is formed by the imaging lens (L5) 12 at the position x2=−10.7 mm with the magnification β2=1.43 approximately (see equation (4) in FIG. 3B).

As per the above, the ratio of f1 to f2 is about 2, and the light source image at the position of the aperture stop (A) 5 is magnified by the magnification varying unit 7 twice as large as the light source image at the position of the aperture stop (A') 5' that is magnified by the magnification varying unit 17. Therefore, the magnification of the light source can be changed or switched by two-fold. For example, if the magnification of the light source in the epi-illumination apparatus in which the magnification varying unit 17 is inserted is set to 4×, the magnification of the light source can be switched to 8× by replacing the magnification varying unit 17 with the magnification varying unit 7.

In the arrangement shown in FIG. 3A in which the magnification varying unit 7 is inserted, the last aperture stop position for the field lens (L4) 9 is the position of the image of the aperture stop (A) 5 (shown by dashed arrows). On the other hand, in the arrangement shown in FIG. 3B in which the magnification varying unit 17 is inserted, the position of the last aperture stop for the field lens (L4) 9 is the actual position of the aperture stop (A') 5'. These last aperture stop positions with respect to the magnification varying units 7 and 17 coincide with each other. Therefore, the aperture stop (A) 5 of the magnification varying unit 7 is optically conjugate to the pupil position A" of the objective lens 51 with respect to the imaging lens (L3) 6 and the field lens (L4) 9, and the aperture stop (A') 5' of the magnification varying unit 17 is optically conjugate to the pupil position A" of the objective lens 51 with respect to the field lens (L4) 9. So, it is possible to realize significantly uniform illumination in which variation in light distribution characteristics is small.

Though in the foregoing descriptions it is assumed that |L3|=|L5| and a=b, it is possible to set the values of |L3|, |L5|, a and b appropriately so that the conjugate position F' of the field stop (F) 8 in the light source side would coincide with the rear focal point position of the collector lens (L1) 2. Thus, it is possible to realize significantly uniform illumination in which variation in light distribution characteristics is small.

As per the above, in designing the epi-illumination apparatus according to the present embodiment, it is preferable to design the values of |L3|, |L5|, a and b so that the position of the aperture stop (A) 5 at which the light source image is formed would be optically conjugate to the pupil position A" of the objective lens 51 and the conjugate position F' of the field stop (F) 8 in the light source side would coincide with the rear focal point position of the collector lens (L1) 2. With such a design, it is possible to realize significantly uniform illumination in which variation in light distribution characteristics is small when the magnification varying unit 7 and the magnification varying unit 17 are interchanged.

As described above, the magnification varying units 7 and 17 used in the epi-illumination apparatus according to the present embodiment have simple structures in which the imaging lens (L3) 6 or the imaging lens (L5) 12 is disposed in the rear or front side of the aperture stop (A) 5 or (A') 5'. So the optical path lengths of the magnification varying units 7 and 17 are short, so that a compact epi-illumination apparatus can be provided. In addition, a user can mount/dismount the magnification varying units 7 and 17 by a simple operation. Furthermore, by designing the values of |L3|, |L5|, a and b appropriately, it is possible to provide an epi-illumination apparatus that can illuminate the surface of a specimen 52 uniformly with small variations in light distribution characteristics.

While in the-above-described embodiment, the description has been made in terms of the magnification varying units 7 and 17 in which the imaging lens (L3) 6 or the imaging lens (L5) 12 is disposed in the rear or front side of the aperture stop (A) 5 or (A') 5', the structure of the magnification varying units may be modified. For example, it is possible to design the epi-illumination apparatus in such a way that the magnification varying unit 7 has the aperture stop (A) 5 and the imaging lens (L3) 6, while the magnification varying unit has only the aperture stop (A') 5' without providing the imaging lens (L5) 12. Similarly, it is also possible to design the epi-illumination apparatus in such a way that the magnification varying unit 7 has only the aperture stop (A) 5 without providing the imaging lens (L3) 6, while the magnification varying unit 17 has the aperture stop (A') 5' and the imaging lens (L5) 12. In these cases also, changing or switching of the magnification of the light source can be attained, though it is difficult for the above mentioned conjugate relationships to be met.

While in the embodiment as described above the magnification varying units 7 and 17 are interchanged by mounting/dismounting the units 7 and 17, the interchanging or switching of the magnification varying units may be performed in other ways. For example, the magnification varying units 7 and 17 may be secured to a turret or a slider so that the magnification varying unit to be used might be switched by rotating the turret or sliding the slider.

Figures 4A, 4B:
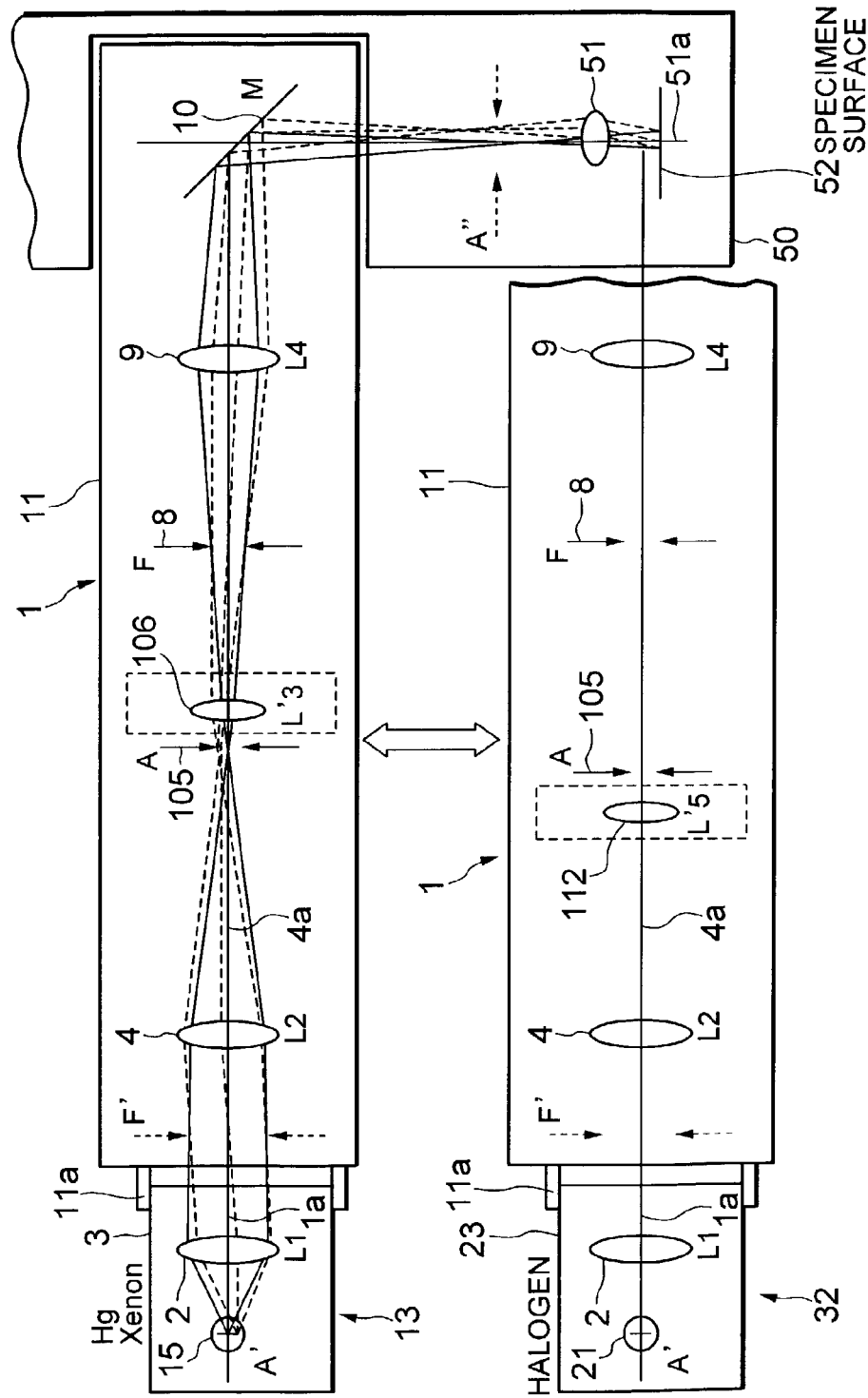
FIGS. 4A and 4B are diagrams similar to FIGS. 1A and 1B, showing an epi-illumination apparatus according to a second embodiment of the present invention in which the magnification varying units have been replaced by arrangements different from those in FIGS. 1A and 1B.

FIGS. 4A and 4B are the drawings similar to FIGS. 1A and 1B, which show the second embodiment of the present invention.

The apparatus according to the second embodiment is the same as that of the first embodiment shown in FIGS. 1A and 1B except for the arrangement of a magnification varying lens and an aperture stop. So in the following, only the magnification varying lens and the aperture stop will be described, and the description of the elements same as those in the first embodiment will be omitted.

In the epi-illumination apparatus according to the second embodiment, an aperture stop 105 is fixed in a lens barrel 11 at a position, between an imaging lens (L2) 4 and a field lens (L4) 9, which is optically conjugate to an pupil position A'' of an objective lens 51 of a microscope 50. In this epi-illumination apparatus according to the second embodiment, only an imaging lens 106 or 112 for varying the magnification is selectively inserted or disposed in the lens barrel 11.

When a lamp house 13 that has an Hg or Xe discharge tube as the light source (A') 1 is attached to the epi-illumination apparatus 1, an imaging lens 106 for varying the magnification is inserted to be set at a position in the back side of the aperture stop 105, as shown in FIG. 4A. On the other hand, when a lamp house 32 that has a halogen lamp as the light source (A') 21 is attached to the epi-illumination apparatus 1, an imaging lens 112 for varying the magnification is inserted to be set at a position in the front side of the aperture stop 105, as shown in FIG. 4B.

The imaging lenses 106 and 112 for varying the magnification have the same optical properties and the same focal lengths as the imaging lenses 6 and 12 for varying the magnification used in the first embodiment. The distance between the imaging lens 106 for varying the magnification and the aperture stop 105 in FIG. 4A is 7.5 mm, and the distance between the imaging lens 112 for varying the magnification and the aperture stop 105 in FIG. 4B is also 7.5 mm. All of the other numerical values assumed in the description of the first embodiment in connection with FIGS. 3A and 3B set forth above also apply to this second embodiment.

In the second embodiment, the description has been made of a case in which only the imaging lens for varying the magnification is interchangeable. But the imaging lens for varying the magnification and the aperture stop may be formed as a unit, so that they might be changed or replaced together.

In the above descriptions of the first and second embodiments, two lamp houses 13 and 32 that have the light source (A') 15 in the form of an Hg or Xe discharge tube and the light source (A') 21 in the form of halogen lamp respectively have been described as light source devices. But the type and the number of the light apparatus are not limited to them. For example, three types of light source devices that have a halogen lamp, mercury vapor lamp and xenon lamp respectively may be selectively attached to the epi-illumination apparatus 1. In that case, three types of magnification varying units would be selectively used in accordance with the type of the light source device. Depending on the circumstances, one magnification varying unit may be commonly used for a plural types of light source devices.

Furthermore, other types of light source devices such as a device that utilizes an optical fiber or an LED may also be used.

As per the above, with the present invention, it is possible to provide an epi-illumination apparatus in which the magnification of the light source can be switched easily while maintaining compactness of the optical system.

What is claimed is:

1. An epi-illumination apparatus comprising, in the following order from a light source device side:
   a first imaging lens which forms an image of the light source; and
   a field lens which projects said image of the light source toward an object to be illuminated;
   wherein either one of a first magnification varying unit or a second magnification varying unit is selectively disposed between said first imaging lens and said field lens in order to vary a magnification of said image of the light source, said first magnification varying unit including a first aperture stop and a second imaging lens that is disposed in the field lens side of the first aperture stop, and said second magnification varying unit including a second aperture stop and a third imaging lens that is disposed in the first imaging lens side of the second aperture stop; and
   wherein said first aperture stop in said first magnification varying unit is disposed at a focal point position of said first imaging lens, and said second aperture stop in said second magnification varying unit is disposed at a combined focal point position of said first and third imaging lenses.

2. An epi-illumination apparatus comprising, in the following order from a light source device side:
   a first imaging lens which forms an image of the light source; and
   a field lens which projects said image of the light source toward an object to be illuminated;
   wherein either one of a first magnification varying unit or a second magnification varying unit is selectively disposed between said first imaging lens and said field lens in order to vary a magnification of said image of the light source, said first magnification varying unit including a first aperture stop and a second imaging lens that is disposed in the field lens side of the first aperture stop, and said second magnification varying unit including a second aperture stop and a third imaging lens that is disposed in the first imaging lens side of the second aperture stop;
   said object to be illuminated is an objective lens of a microscope;
   said field lens projects said image of the light source at the position of a pupil of said objective lens;
   said first aperture stop in said first magnification varying unit is optically conjugate to a pupil position of said objective lens with respect to said second imaging lens and said field lens; and said second aperture stop in said second magnification varying unit is optically conjugate to the pupil position of said objective lens with respect to said field lens.

3. An epi-illumination apparatus comprising, in the following order from a light source device side:
   a first imaging lens which forms an image of the light source; and
   a field lens which projects said image of the light source toward an object to be illuminated;
   wherein either one of a first magnification varying unit or a second magnification varying unit is selectively disposed between said first imaging lens and said field lens in order to vary a magnification of said image of the light source, said first magnification varying unit including a first aperture stop and a second imaging lens that is disposed in the field lens side of the first aperture stop, and said second magnification varying unit including a second aperture stop and a third imaging lens that is disposed in the first imaging lens side of the second aperture stop and;
   a field stop is disposed between said field lens and said first or second magnification varying unit, and a position that is optically conjugate to said field stop with respect to said first imaging lens and said second or third imaging lens coincides with a rear focal point position of a collector lens that is included in said light source device.

4. An epi-illumination apparatus according to claim 2, wherein a field stop is disposed between said field lens and said first or second magnification varying unit, and a position that is optically conjugate to said field stop with respect to said first imaging lens and said second or third imaging lens coincides with a rear focal point position of a collector lens that is included in said light source device.

5. An epi-illumination apparatus according to claim 1, wherein:
   said object to be illuminated is an objective lens of a microscope;
   said field lens projects said image of the light source at the position of a pupil of said objective lens;
   said first aperture stop in said first magnification varying unit is optically conjugate to a pupil position of said objective lens with respect to said second imaging lens and said field lens; and
   said second aperture stop in said second magnification varying unit is optically conjugate to the pupil position of said objective lens with respect to said field lens.

6. An epi-illumination apparatus according to claim 5, wherein a field stop is disposed between said field lens and said first or second magnification varying unit, and a position that is optically conjugate to said field stop with respect to said first imaging lens and said second or third imaging lens coincides with a rear focal point position of a collector lens that is included in said light source device.

7. An epi-illumination apparatus according to claim 1, wherein a field stop is disposed between said field lens and said first or second magnification varying unit, and a position that is optically conjugate to said field stop with respect to said first imaging lens and said second or third imaging lens coincides with a rear focal point position of a collector lens that is included in said light source device.

* * * * *